UNITED STATES PATENT OFFICE.

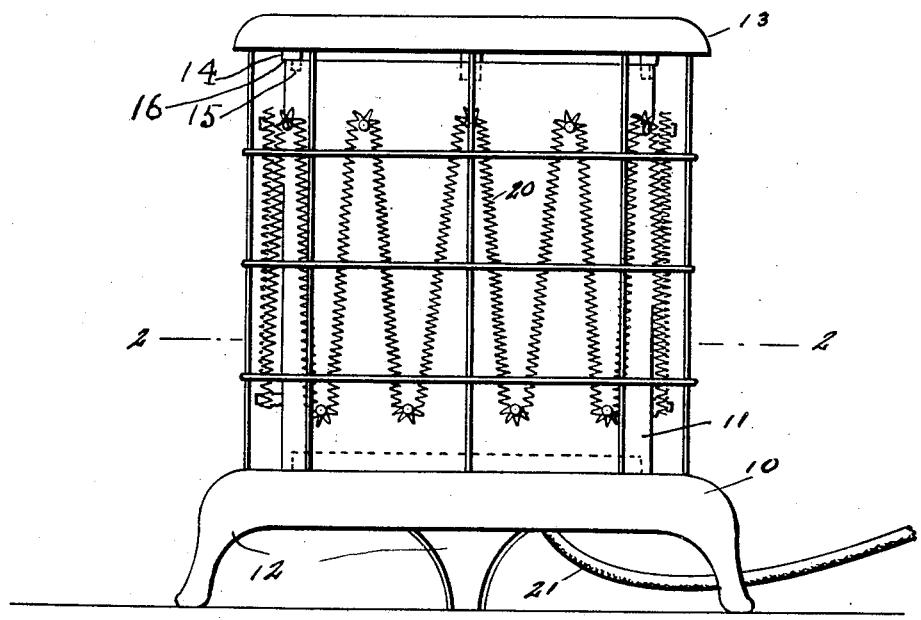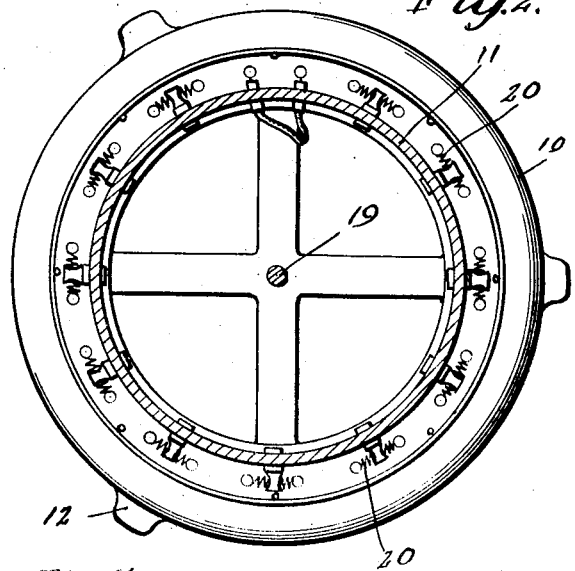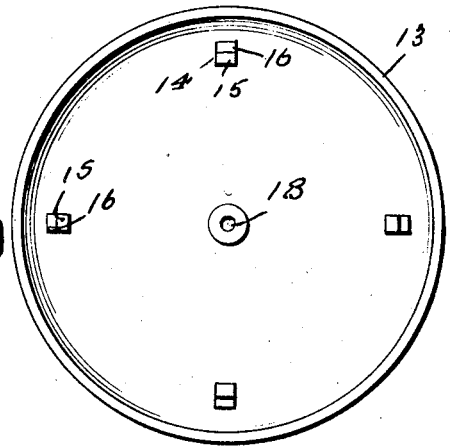

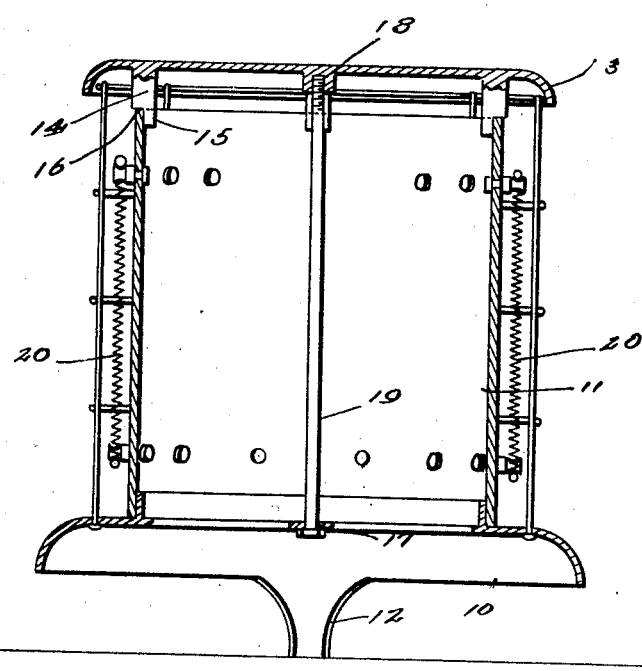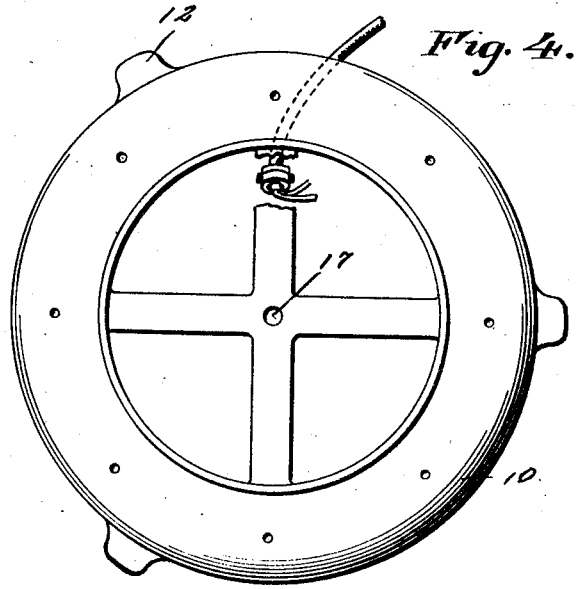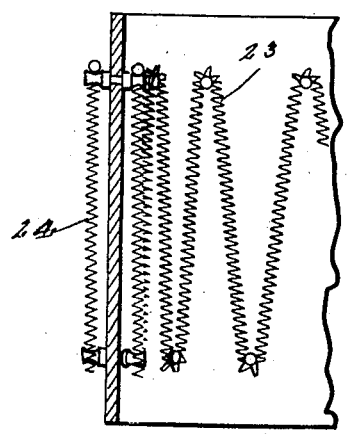

HARRY A. SCISINGER AND EMMETT W. ADAMS, OF CHICAGO, ILLINOIS.

HEATER.

1,366,840.  Specification of Letters Patent.  Patented Jan. 25, 1921.

Application filed June 29, 1920. Serial No. 392,709.

*To all whom it may concern:*

Be it known that we, HARRY A. SCISINGER and EMMETT W. ADAMS, citizens of the United States of America, residing at Chicago, in the county of Cook and State of Illinois, have invented new and useful Improvements in Heaters, of which the following is a specification.

This invention comprehends the provision of an electric heater including a heat radiating drum, upon the outside of which is arranged a plurality of coils, for heating the air about the drum, the heated air passing from within the drum and the top thereof, being thus superheated.

In carrying out the invention, the heater is provided with a top which is spaced from the adjacent end of the heating drum, so as to deflect the heat outwardly over the coils arranged upon the outside of the drum, and then radiated horizontally into the room, thus heating the room in quick order.

The nature and advantages of the invention will be better understood when the following detail description is taken in connection with the accompanying drawings, the invention residing in the construction, combination and arrangement of parts as claimed.

In the drawings forming part of this application, like numerals of reference indicate similar parts in the several views and wherein:—

Figure 1 is a view in elevation of the heater constructed in accordance with one form of the invention.

Fig. 2 is a horizontal sectional view taken on line 2—2 of Fig. 1.

Fig. 3 is a vertical sectional view.

Fig. 4 is a detail view of the bottom.

Fig. 5 is a similar view of the top.

Fig. 6 is a fragmentary view of a modified form showing the heating elements arranged both within the drum and on the outside thereof.

Referring to the drawings in detail, 10 indicates a base upon which the heating drum 11 is supported, the base 10 being spaced from the floor or surface by means of legs 12. The drum 11 is preferably made of copper, although any suitable material may be employed in the production of the heater, and the heater may also vary in size and configuration without departing from the spirit of the invention. A top plate 13 is used in conjunction with the drum 11, the top being provided with depending lugs 14 having reduced terminals 15 thus providing shoulders 16 that rest upon the upper end of the drum 11, and serve to support the top plate 13 in spaced relation to the drum. This provides for the escape of heated air from within the drum over the upper end thereof. The top plate 13 is also formed with a downwardly curved edge or flange for a purpose to be presently described. The base 10 is provided with a central opening 17 which is disposed in axial alinement with an opening 18 at the top, these openings receiving a fastening bolt 19 for holding the parts fixed relatively. Arranged upon the outside of the drum 11 are heating coils 20 the conducting wire being indicated at 21. By reason of this construction, the interior of the drum is not only heated, so as to heat the air entering the drum at the bottom, such heated air passes over the upper edge of the drum through the space between the latter and the top plate 13, but the heating coils also heat the air about the outside of the drum, and as this air is heated and rises upwardly it comes and goes with the air expelled from the drum at the top, thereby superheating the air. The air as it passes from the top of the drum, is deflected downwardly by the curved edges of the top, thus throwing the heated air against the heating coils on the outside of the drum, and while a portion of this air rises above the heater, a considerable portion of the heated air is radiated horizontally into the room, thus heating the room in quick order. If desired, suitable heating elements 23 may be arranged within the drum in addition to the coils 24 on the outside of the drum as shown in Fig. 6. The construction not only embodying these desired features of simplicity, and compactness, but the various parts can be readily separated if the occasion require, by simply removing the fastening bolt 19.

While it is believed that from the foregoing description the nature and advantages of the invention will be readily apparent, we desire to have it understood that we do not limit ourselves to the details shown and that such changes may be resorted to when desired as fall within the scope of what is claimed.

What we claim is:—

1. In an electric heater, a base, a heat radiating drum mounted upon the base, a top, a single fastening element for holding the base, drum and top associated, said top being spaced from the upper edge of the drum, and having its edge curved downwardly, and heating elements associated with the drum.

2. An electric heater comprising a base having a central opening, a heat radiating drum mounted upon the base, a top supported upon the drum in spaced relation thereto, said top having an opening in aline with the fore-mentioned opening, and a fastening element passed through said opening and the drum and having all of said parts fixed relatively, and heating elements associated with the drum.

3. An electric heater comprising a base, a heat radiating drum supported upon the base, a top supported upon the drum in spaced relation thereto, said top having its edges curved downwardly, means for holding said parts fixed relatively, and heating coils arranged upon the outside of the drum.

In testimony whereof we affix our signatures.

HARRY A. SCISINGER.
EMMETT W. ADAMS.